3,553,223
ACID CATALYZED CYCLIZATION OF TETRAHYDROPYRIDINES CONTAINING AN ELECTRON WITHDRAWING GROUP ON THE NITROGEN

Willy Leimgruber, Montclair, and Ernest Mohacsi, Nutley, N.J., assignors to Hoffman-La Roche Inc., Nutley, N.J., a corporation of New Jersey
No Drawing. Filed Jan. 5, 1968, Ser. No. 695,862
Int. Cl. C07d 39/00
U.S. Cl. 260—294.7      2 Claims

ABSTRACT OF THE DISCLOSURE

There is described a process for the acid catalyzed cyclization of 2 - (4-methoxybenzyl)-3,4-dialkyl-1,2,5,6-tetrahydropyridines substituted at the nitrogen atom with electron withdrawing groups, to the corresponding benzomorphan compounds utilizing novel intermediates. The benzomorphan compounds so produced are useful as intermediates in the preparation of pharmaceutically active compounds, e.g., known benzomorphan derivatives exhibiting analgesic activity.

BACKGROUND OF THE INVENTION

Benzomorphans, many of which possess potent analgesic activity, are produced by processes which include an acid catalyzed cyclization of 2-(4-methoxybenzyl)-1,3,4-trialkyl-1,2,5,6-tetrahydropyridines with the resultant production of a mixture of isomeric 1,2,3,4,5,6-hexahydro-3,6,11-trialkyl-2,6-methano-3-benzazocin - 8 - ols. This cyclization can be accomplished only by utilizing severe reaction conditions, i.e., temperatures of about 180° C. are required to effect cyclization, thus generally causing low yields and undesired by-products. These severe conditions also make it difficult to produce many benzomorphans which are of pharmacological interest.

SUMMARY OF THE INVENTION

This invention relates to a process for producing benzomorphan compounds by the acid catalyzed cyclization of 2 - (4-methoxybenzyl) - 3,4 - dialkyl-1,2,5,6-tetrahydropyridines possessing electron withdrawing groups on the nitrogen atom. This invention also relates to novel compounds useful in and formed by the invention process.

DETAILED DESCRIPTION OF THE INVENTION

This invention is based on the discovery that an acid catalyzed cyclization can take place using much milder reaction conditions than heretofore possible to produce novel compounds useful in the preparation of pharmaceutically active benzomorphan compounds. This is possible, according to this invention, by utilizing as the starting material a pyridine compound substituted at the nitrogen atom with an electron withdrawing group, i.e., a group which neutralizes the basicity of the nitrogen atom. Representative compounds containing electron withdrawing groups which are suitable for use in this invention are those represented by the formulas

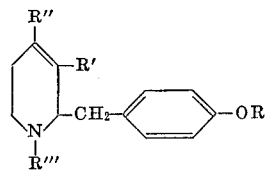

I(a)

and

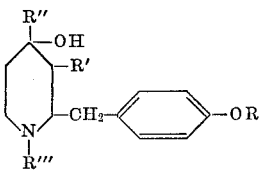

I(b)

wherein in each of the formulas R is hydrogen, lower alkyl, acyl or aroyl; R' is hydrogen, lower alkyl or aryl; R" is lower alkyl or aryl and R''' is —COR' or —SO$_2$R".

As used herein, lower alkyl means straight or branched alkyl groups with from 1 to 8 carbon atoms, e.g., methyl, ethyl, propyl, isopropyl, butyl, tertiary butyl, pentyl, hexyl, heptyl, octyl and the like; aroyl means substituted or unsubstituted benzoyl or naphthoyl groups; aryl means substituted or unsubstituted phenyl or naphthyl groups; acyl means a lower alkanoyl group containing up to 6 carbon atoms, e.g., acetyl.

The compounds encompassed by Formulas I(a) and I(b) can be optically active compounds and either the racemates or the dextrorotatary or levorotatory antipodes are suitable for use in this invention.

All the compounds encompassed by Formulas I(a) and I(b) are suitable for use in the process of this invention, however, because they are particularly effective in the process, i.e., higher yields at milder conditions, the compounds of Formulas I(a) and I(b) wherein R''' is

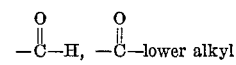

and —SO$_2$— lower alkyl are preferred.

These compounds are useful in the process of this invention in either the D, L or racemic forms.

Among the preferred group of compounds, the N-formyl and N-acetyl derivatives are particularly advantageous since very high yields, e.g., above about 90% are attained upon their cyclization. Furthermore, the N-formyl and N-acetyl groups can be removed from the cyclization products with facility under mild conditions. In the case of the benzomorphans, the product which results from the removal of the formyl or acetyl groups is the unsubstituted compound which heretofore could only be obtained by removal of alkyl groups from the nitrogen by difficult and severe process conditions, e.g., von Braun degradation.

The benzomorphan products which result from the process of this invention are intermediates useful for producing known compounds with pharmacological properties, e.g., pentazocine (2 - dimethylallyl - 5,9 - dimethyl-2' - hydroxy - 6, 7 -benzomorphan) can be prepared by removing the electron withdrawing group from the cyclized compound, O-demethylating the methoxy group and substituting the dimethylallyl group onto the nitrogen. Alternatively, the nitrogen can be substituted by, for example, the cyclopropylmethyl group. The products which result from the process of this invention can also be converted to a mixture of the compounds, 1,2,3,4,5,6-hexahydro - 8 - methoxy - 3,6α,11α - trimethyl - 2,6-methano - 3 - benzazocine and 1,2,3,4,5,6 - hexahydro-8 - methoxy 3,6α,11β - trimethyl - 2,6 - methano - 3 - benzazocine, by reduction with lithium aluminum hydride.

Novel compounds useful as intermediates and produced by the process of this invention are represented by the following formula

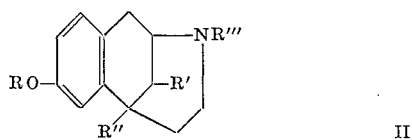

wherein R, R″ and R‴ are the same as set forth under Formulas I(a) and I(b).

The compounds defined by Formula II may be optically active and all forms, i.e., racemic, D and L, are included within the scope of this invention.

The process of this invention is illustrated by the following reaction scheme wherein the compounds of Formula I(a) are used as representative.

Scheme I

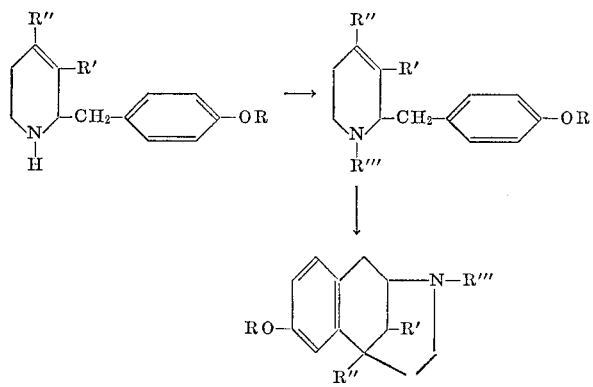

The essential process conditions which are utilized in the cyclization of compounds such as I(a) and I(b) are dependent upon the specific nature of the electron withdrawing group R‴, temperature, time and amount and identity of acid catalyst used.

Generally, the operable temperature range is from about 0° C. to about 160° C. The best results are obtained, however, at temperatures of from about 50° C. to about 100° C., depending upon the acid used, the electron withdrawing group present and the time of reaction desired.

The reaction times are variable and can be altered by a change in either the amount or identity of the acid catalyst, identity of electron withdrawing group and temperature. For example, using a 50 to 1 mixture, by weight, of phosphoric acid and concentrated sulfuric acid, respectively, as the catalyst at temperatures of about 70° C. requires about half a day to complete the reaction. Higher temperatures, e.g., 100°–160° C. reduce the reaction time accordingly and lower temperatures, e.g., 0° C. to 50° C. increase the reaction times to as much as 2–4 days. An increase in the amount of sulfuric acid used in the catalyst decreases the reaction time but has a deleterious effect on the yields. The amount of acid catalyst used is not critical since even minute amounts, i.e., less than a mole, will effect a reaction. However, an increase in the amount of acid beyond one mole will reduce the reaction time to practical levels.

The acids which can be used to catalyze the cyclization are organic and inorganic acids, either in mixtures or singly. These acids can be used in the presence of solvents but they need not be. The concentration of the acid is not critical but for convenience, generally commercially available concentrated acids are used. Acids which are suitable are, for example, HCl, HBr, HI, HF, $H_2SO_4$, $H_3PO_4$, $FSO_3H$, polyphosphoric acid (PPA), esterified polyphosphoric acid (PPE), $POCl_3$, Lewis Acids, HCOOH, $CH_3COOH$, $Cl_3CCOOH$, $F_3CCOOH$, p-toluene sulfonic acid and the like.

Especially preferred are $H_3PO_4$, HCl, $H_2SO_4$, PPA or mixtures containing them.

The compounds of Formulas I(a) and I(b) are equivalent in this process since irrespective of which one is utilized as the starting material, the corresponding compound of Formula II is produced.

The compounds of Formulas I(a) and I(b) and the acid are mixed together and the mixture is heated at appropriate temperatures until the reaction is complete. This reaction can take place in an inert atmosphere, e.g., nitrogen, however, this is not critical to the operability of the inventive process. The products are recovered, usually by extraction, though the invention is not limited to this method of recovery.

The benzomorphan cyclization products can be treated to remove the electron withdrawing group as in the following reaction scheme.

Scheme II

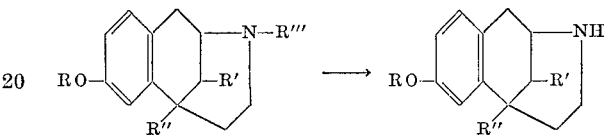

This reaction can be effected by alkali hydroxide in methanol, or acid, e.g., hydrochloric acid in methanol. The resulting product containing an unsubstituted nitrogen can be substituted at the nitrogen by known means, e.g., the nitrogen can be methylated with formaldehyde and hydrogen over Raney nickel to form known compounds which have pharaceutical utility, e.g., analgesics, as well as the ability to be converted by known reactions into other compounds with pharmaceutical utility, e.g., analgesics.

N-alkylated benzomorphans can be obtained by reducing the electron withdrawing group, e.g.

or

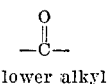

lower alkyl of the benzomorphan cyclization products with lithium aluminum hydride according to the following reaction scheme.

Scheme III

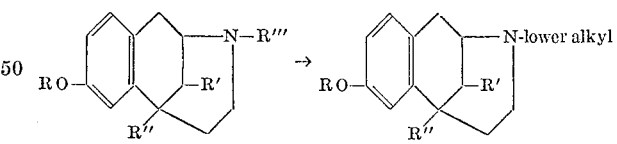

In the event an optical antipode rather than the racemate is the desired end product, some of the intermediates or the final products can be resolved by means well known to the art, e.g., formation of a tartrate salt or brucine salt. Advantageously, however, the starting material used should be previously resolved to the D or L form depending on the desired absolute configuration of the end product.

The benzomorphan cyclization products are usually a mixture of isomers with the hydrogens at the 6 and 11 positions being either $\alpha,\alpha$ or $\alpha,\beta$. The former is the predominant product, usually in a ratio of about 4 to 1 as determined by vapor phase chromatography (VPC).

The method of producing the compounds containing the electron withdrawing group varies with the particular group involved. For example, a formyl substituent can be attached to the nitrogen by reacting 2-(4-methoxybenzyl)-3,4-dimethyl - 1,2,5,6 - tetrahydropyridine with methyl formate. The 2-(4-methoxybenzyl)-3,4-dimethyl-1,2,5,6-tetrahydropyridine can be acetylated with acetic anhydride in pyridine or ethoxycarbonylated with ethyl chloroformate or carbamoylated with urea or benzoylated with benzoylchloride, all conventional reactions using conditions well known in the art.

2-(4-methoxybenzyl)-3,4-dimethyl - 1,2,5,6 - tetrahydropyridine, the starting material in the benzomorphan synthesis is a novel compound and can be prepared by reacting p-methoxybenzyl chloride with 3,4-lutidine in a suitable solvent followed by reacting the product, 1-(4-methoxybenzyl)-3,4-dimethyl pyridinium chloride with a Grignard reagent formed from p-methoxybenzyl chloride. The resulting product is then reduced with sodium borohydride in alkaline medium to 2-(4-methoxybenzyl)-3,4-dimethyl-1,2,5,6-tetrahydropyridine which is then converted to the hydrochloride and reduced with hydrogen in the presence of a palladium-carbon catalyst. The above products and process are not part of this invention but are disclosed for completeness.

The racemates or optical antipodes of these compounds can be produced by the process described hereinabove.

The following examples are for illustrative purposes only. All temperatures are in ° C. Melting points were taken in capillaries with a Thomas Hoover melting point apparatus and are uncorrected. Boiling points are uncorrected.

EXAMPLE 1

Preparation of 2-(4-methoxybenzyl) - 3,4 - dimethyl - 1, 2,5,6-tetrahydropyridine hydrochloride according to Scheme I.

(a) Preparation of p-methoxybenzyl chloride.—1 kg. of p-methoxybenzyl alcohol was dissolved in 3.7 l. of dry, thiophene-free benzene and the solution cooled in an ice-bath. Hydrogen chloride was bubbled into the solution during which time the inside temperature was kept below 20°. When 113 ml. of water had been collected and removed, 300 g. of anhydrous magnesium sulfate was added to the benzene solution. The solution was filtered and the benzene removed in vacuo (water-bath temperature 30°). The product was crude p-methoxybenzyl chloride which on vapor phase chromatography showed an 89% component. This material can be used crude or it can be distilled (B.P. 77–9°/1 mm., showing by VPC a 97.5% component).

(b) Preparation of 1 - (4-methoxybenzyl) - 3,4 - dimethylpyridinium chloride.—430 g. (2.75 moles) of crude p-methoxybenzyl chloride was added to a stirred solution of 268 g. (2.5 moles) of 3,4-lutidine in 800 ml. of acetonitrile. The exothermic reaction may be initiated by boiling a few milliliters of solution with an equal volume of acetone until crystallization occurs and then seeding the solution. The mixture was stirred at room temperature for two hours and filtered. The product was washed with 200 ml. of acetonitrile and then dried in a vacuum oven at 50° overnight. The product melted at 191–3° (sintered at 188°). A small portion was recrystallized from acetone and melted at 192–3°.

Analysis.—$C_{15}H_{18}ClNO$ (percent): Calc'd for C, 68.31; H, 6.83. Found (percent): C, 68.24; H, 7.06.

(c) Preparation of 1,2 - di - (4-methoxybenzyl)-3,4-dimethyl-1,2-dihydropyridine.—156 g. (1 mole) of crude p-methoxybenzyl chloride in 1 l. of dry ether was added over a 5 hour period to 60 g. of magnesium turnings (2.5 g. atoms) 60 g. of magnesium powder (2.5 g. atoms) in 1 l. of refluxing dry ether, under nitrogen. The resulting Grignard reagent was filtered under nitrogen through glass wool and added quickly to a stirred suspension of 1-(4-methoxybenzyl) - 3,4 - dimethylpyridinium chloride (236 g., 0.9 mole) in 2 l. of dry ether. The reaction mixture was stirred overnight at room temperature. It was then poured onto an ice-ammonium chloride solution. The ether layer was separated, dried (anhydrous potassium carbonate) and the ether distilled off. The crude product was a reddish oil.

(d) Preparation of 1,6 - di - (4-methoxybenzyl) - 4,5-dimethyl - 1,2,3,6 - tetrahydropyridine hydrochloride.—25.4 g. of sodium borohydride was added portionwise to a rapidly stirred mixture of 241 g., of crude 1,2-di(methoxybenzyl) - 3,4 - dimethyl - 1,2 - dihydropyridine and 350 ml. of 1 N sodium hydroxide in 540 ml. of methanol over a period of 20 minutes without cooling. After the addition, the mixture was refluxed for 2 hours. The mixture was cooled, diluted with 500 ml. of water and the oil extracted with ether. The ether extract was dried over anhydrous potassium carbonate and the ether distilled off. The main fraction distilled from 210–235°/1 mm. The oil was dissolved in 500 ml. of dry ether and the product was converted to the hydrochloride by bubbling hydrogen chloride gas into the solution. The ether was decanted from the pasty hydrochloride and 300 ml. of acetone added. The mixture was refluxed until the pasty salt solidified. The product was filtered M.P. 196–200°. The crystals were recrystallized from acetone-methanol to yield the desired product, M.P. 203–206°.

Analysis.—$C_{23}H_{29}NO_2 \cdot HCl$ (percent): Calc'd for C, 71.22; H, 7.75. Found (percent): C, 71.06; H, 8.08.

(e) Preparation of 2 - (4-methoxybenzyl) - 3,4 - dimethyl - 1,2,5,6 - tetrahydropyridine hydrochloride.—5 g. of 10% palladium-carbon catalyst was added to 38.8 g. (.1 mole) of 1.6-di-(4-methoxybenzyl) - 4,5 - dimethyl-1,2,3,6-tetrahydropyridine hydrochloride in 250 ml. methanol. The mixture was shaken in a Parr hydrogenation apparatus for 6 hours at 50 lbs. pressure and room temperature or until 0.1 mole of hydrogen had been absorbed. The mixture was filtered and the filtrate concentrated in vacuo. The residue (oil) was crystallized by refluxing with 100 ml. of ethyl acetate. The first crop had a M.P. 145–7°. A second crop was obtained by removing the ethyl acetate and adding ether to solidify the residual oil. The crude solid was recrystallized from acetone-methanol. The combined fractions were recrystallized from ethyl acetate-methanol and had a M.P. 148–150°.

Analysis.—$CH_{15}H_{21}NO \cdot HCl$ (percent): Calc'd for C, 67.28; H, 8.22; N, 5.23. Found (percent): C, 67.31; H, 8.76; N, 5.21.

EXAMPLE 2

Preparation of 3,4 - dimethyl - 2 - (p-methoxybenzyl)-5,6-dihydro-1(2H)-pyridinecarboxaldehyde A solution of 21 g. of 2-(4-methoxybenzyl)-3,4-dimethyl-1,2,5,6-tetrahydropyridine in 90 ml. of freshly distilled methyl formate was heated in a glass liner under nitrogen (260 p.s.i.) for 21 hours at 60–62°. The excess of methyl formate was then removed under reduced pressure to give 22.0 g. of crude 3,4-dimethyl-2-(p-methoxybenzyl) - 5,6 - dihydro - 1(2H)-pyridinecarboxaldehyde (boiling point 150–156°/0.1 mm.).

EXAMPLE 3

Cyclization of 3,4-dimethyl-2-(p-methoxybenzyl)-5,6-dihydro-1(2H)-pyridinecarboxaldehyde 22.0 g. of 3,4 - dimethyl - 2 - (p-methoxybenzyl) - 5,6 - dihydro-1(2H)-pyridinecarboxaldehyde was added with stirring to a mixture of phosphoric acid (200 g.) and conc. sulfuric acid (4.0 g.) and the resulting mixture was heated at 70° for 17 hours under nitrogen. The reaction mixture was cooled in an ice bath, diluted with 400 ml. of ice water, and extracted with chloroform (3 × 250 ml.). The combined organic layers were washed with water (200 ml.), dried over magnesium sulfate and filtered. Concentration of the filtrate gave 21.8 g. (99%) of product, consisting of a mixture of 1,4,5,6-tetrahydro-6α,11α-dimethyl - 8 - methoxy-2,6-methano-3-benzazocine-3(2H)-carboxaldehyde and 1,4,5,6-tetrahydro-6α,11β-dimethyl-8-methoxy - 2,6 - methano-3-benzazocine-3(2H) - carboxaldehyde. VPC-analysis indicated for these isomers carboxaldehyde. VPC-analysis indicated for these isomers a ratio of about 4:1. This material has a B.P. 160–167°/ 0.1 mm. and upon analysis for the molecular formula $C_{16}H_{21}NO_2$ (259.35): Calc'd (percent): C, 74.10; H, 8.16; N, 5.40. Found (percent): C, 73.99; H, 8.02; N, 5.25.

EXAMPLE 4

Preparation of 1,2,3,4,5,6-hexahydro-8-methoxy-3,6α,11α- and 11β-trimethyl-2,6-methano-3-benzazocines (a) 21.8 g. of a mixture of 1,4,5,6-tetrahydro-6α,11α- and 11β-dimethyl-8-methoxy-2,6-methano-3-benzazocine-3(2H)-carboxaldehyde (ratio 4:1) in anhydrous tetrahydrofuran (195 ml.) was added dropwise to a suspension of lithium aluminum hydride (1.95 g.) in anhydrous tetrahydrofuran (195 ml.). After the mixture had been refluxed for 5 hours under nitrogen, it was cooled to room temperature and ethyl acetate (100 ml.) followed by water (30 ml.) was added dropwise. The resulting suspension was dried over sodium sulfate, filtrated and the filtrate concentrated under reduced pressure. The residue was distilled (B.P. 138–142°/0.4 mm.) to give a crude mixture of 1,2,3,4,5,6-hexahydro-8-methoxy-3,6α,11α-trimethyl-2,6-methano-3-benzazocine and 1,2,3,4,5,6 - hexahydro-8-methoxy-3,6α,11β - trimethyl-2,6-methano-3-benzazocine in a ratio of about 4:1 as indicated by VPC-analysis. This material has a B.P. 115–120°/0.1 mm.

(b) 121 g. of the crude mixture of the compounds produced in Example 3(a) on treatment with 48% hydrobromic acid in acetone afforded 12.9 g. (79%) of a mixture of hydrobromides of 1,2,3,4,5,6-hexahydro-8-methoxy - 3,6α,11α - trimethyl-2,6-methano-3-benzazocine and 1,2,3,4,5,6-hexahydro-8-methoxy-3,6α,11β-trimethyl - 2,6-methano-3-benzazocine, M.P. 230–232°. Several recrystallizations from isopropanol-ether gave pure 1,2,3,4,5,6-hexahydro-8-methoxy-3,6α,11α-trimethyl - 2,6 - methano-3-benzazocine hydrobromide, M.P. 235–236°, undepressed in admixture with an authentic sample. The spectroscopic properties of this compound (IR, UV, NMR, MS) were also identical with those of the authentic material.

EXAMPLE 5

Hydrolysis of 1,4,5,6-tetrahydro-6α,11α- and 11β-dimethyl-8-methoxy-2,6-methano - 3 - benzazocine-3(2H)-carboxaldehyde A crude mixture of 1.19 g. of 1,4,5,6-tetrahydro-6α,11α- and 11β-dimethyl-8-methoxy-2,6-methano-3-benzazocine-3(2H)-carboxaldehyde (ratio 4:1) was dissolved in 25 ml. of methanol and 10 ml. of 2.5 N aqueous sodium hydroxide were added. After this mixture had been heated under reflux for 14 hours, the methanol was removed under reduced pressure and the resulting aqueous suspension extracted with methylene chloride. Removal of the solvent in vacuo yielded a crude mixture of 1,2,3,4,5,6-hexahydro-8-methoxy - 6α,11α - dimethyl-2,6-methano-3-benzazocine and 1,2,3,4,5,6-hexahydro-8-methoxy-6α,11β-dimethyl-2,6-methano-3-benzazocine. The product was distilled (B.P. 115–130°/0.05 mm.) and a sample treated with hydrobromic acid. This afforded a mixture of hydrobromides which, after several recrystallization from isopropanol-ether, afforded pure 1,2,3,4,5,6-hexahydro-8-methoxy-6α,11α-dimethyl-2,6-methano-3-benzazocine hydrobromide, M.P. 160–162°.

We claim:
1. The process of cyclizing a compound selected from those represented by the formulas

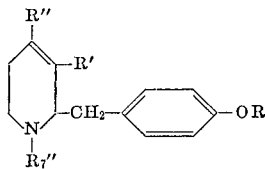

and

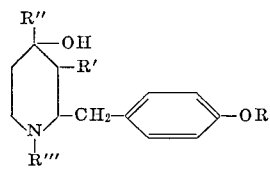

wherein R is hydrogen, lower alkyl, lower alkanoyl containing up to 6 carbon atoms, benzoyl or naphthoyl; R' is hydrogen, lower alkyl, phenyl or naphthyl; R" is lower alkyl, phenyl or naphthyl and R''' is

or

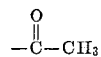

to a corresponding compound represented by the formula

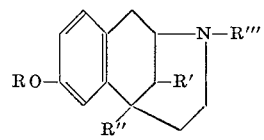

wherein R, R', R" and R''' are as defined above which comprises contacting a starting material with an acid catalyst selected from the group consisting of phosphoric acid and a mixture of phosphoric acid and sulfuric acid at a temperature of from about 50° C. to about 100° C. and isolating the resulting product.

2. The process according to claim 1 wherein the compound to be cyclized is 3,4-dimethyl-2-(p-methoxybenzyl)-5,6-dihydro-1(2H) - pyridinecarboxaldehyde and the product is a mixture of 1,4,5,6-tetrahydro-6α,11α-dimethyl-8-methoxy-2,6-methano-3-benzazocine - 3(2H)-carboxaldehyde and 1,4,5,6-tetrahydro-6α,11β-dimethyl-8-methoxy-2,6-methano-3-benzazocine-3(2H)-carboxyaldehyde.

References Cited
UNITED STATES PATENTS
3,138,603  6/1964  May.
3,320,265  5/1967  Clarke.
3,372,165  3/1968  Archer.

FOREIGN PATENTS
1,079,489  6/1966  Great Britain

OTHER REFERENCES
J. Org. Chem., vol. 25, pp. 984–86, (1960), Ager et al.

NORMA S. MILESTONE, Primary Examiner

S. D. WINTERS, Assistant Examiner

U.S. Cl. X.R.

260—294.3, 293.4, 294.8, 295, 297, 999